United States Patent [19]
Frankenberger

[11] Patent Number: 5,948,277
[45] Date of Patent: Sep. 7, 1999

[54] METHOD FOR REMOVING FLOATING MATTER AND A REMOVING DEVICE

[76] Inventor: Dieter Frankenberger, Vor dem Hohen Stein 1, D-35415 Pohlheim, Germany

[21] Appl. No.: 08/886,419

[22] Filed: Jul. 1, 1997

[30] Foreign Application Priority Data

Jul. 5, 1996 [DE] Germany .......................... 196 27 161

[51] Int. Cl.⁶ .................................................. B01D 21/18
[52] U.S. Cl. ........................ 210/776; 210/803; 210/525; 210/530; 210/540
[58] Field of Search ................... 210/776, 800, 210/803, 525, 528, 530, 540

[56] References Cited

U.S. PATENT DOCUMENTS

| | | | |
|---|---|---|---|
| 2,249,049 | 7/1941 | Sayers et al. | 210/530 |
| 2,879,894 | 3/1959 | Nelson | 210/540 |
| 3,307,701 | 3/1967 | Krofta | 210/195 |
| 3,447,683 | 6/1969 | Luce, Jr. | 210/540 |
| 3,618,768 | 11/1971 | Brown | 210/776 |
| 3,831,767 | 8/1974 | Lefur et al. | 210/530 |
| 4,022,696 | 5/1977 | Krofta | 210/520 |
| 4,377,485 | 3/1983 | Krofta | 210/704 |
| 4,626,345 | 12/1986 | Krofta | 210/104 |
| 5,047,151 | 9/1991 | Brandkvist | 210/525 |
| 5,122,280 | 6/1992 | Russell et al. | 210/540 |
| 5,167,815 | 12/1992 | Bachmann et al. | 210/540 |
| 5,188,729 | 2/1993 | Krofta | 210/525 |
| 5,269,928 | 12/1993 | Leikam | 210/525 |

FOREIGN PATENT DOCUMENTS

| | | |
|---|---|---|
| 3 934 874 | 4/1991 | Germany . |
| 92/01516 | 2/1992 | WIPO . |

*Primary Examiner*—Christopher Upton
*Attorney, Agent, or Firm*—Flynn, Thiel, Boutell & Tanis, P.C.

[57] ABSTRACT

It is necessary in sewage-treatment devices to remove from the waste waters to be cleaned besides the sediment mixtures also impurities which are on the surface of the waste water. This floating matter is according to the invention continuously conveyed into an intermediate container by means of a worm conveyor sweeping over the waste water, from which intermediate container the conveyed matter is discontinuously pumped off.

27 Claims, 2 Drawing Sheets

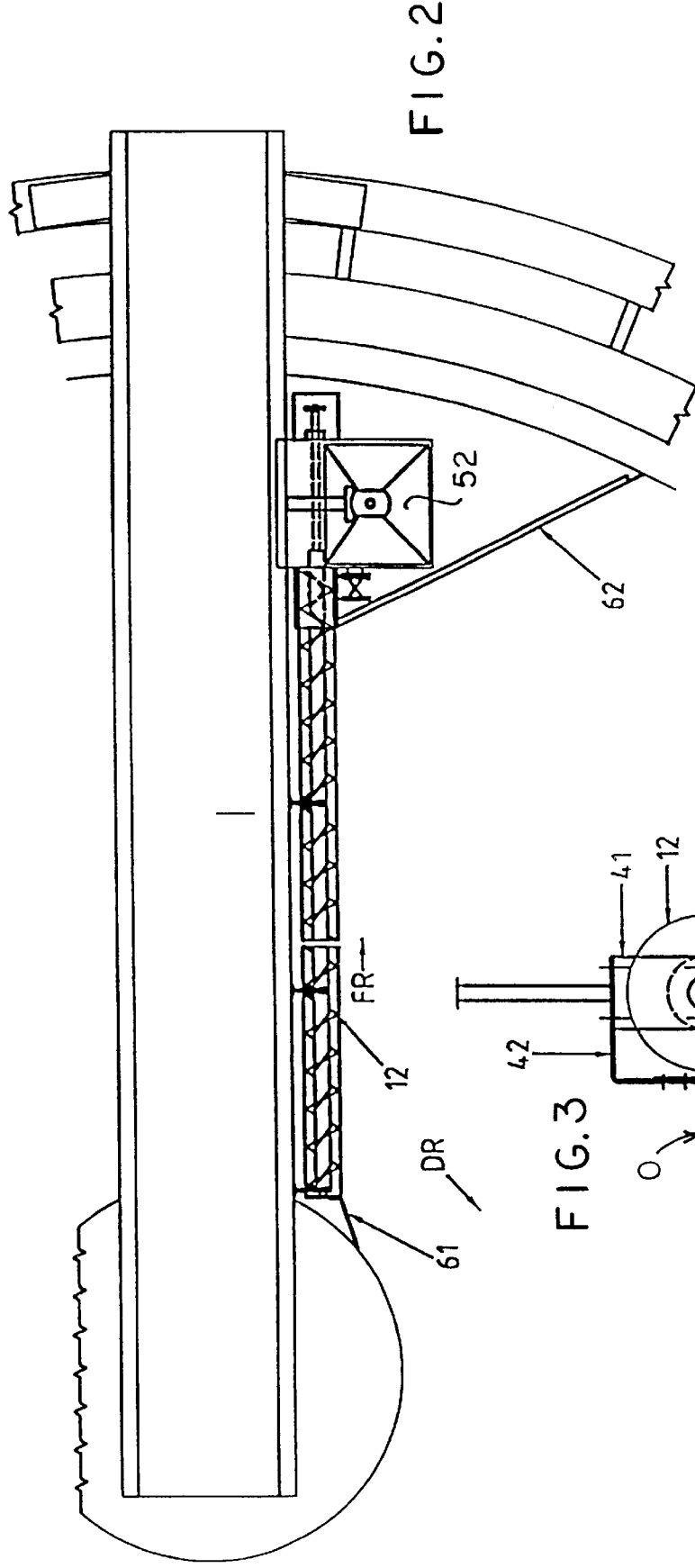

METHOD FOR REMOVING FLOATING MATTER AND A REMOVING DEVICE

FIELD OF THE INVENTION

The invention relates to a method and a device for removing floating matter from the surface of waste water in a settling tank of a sewage-treatment system or the like.

BACKGROUND OF THE INVENTION

During the mechanical cleaning of waste water in settling tanks or other devices, it is necessary, aside from the impurities settled as sediments to also remove floating matter accumulated on the surface. It is common to separate the floating matter from the surface of the waste water through a continuous pumping off or through a mechanical removal thereof. Such a method for the removal and the collection of such floating matter requires considerable expense. The floating matter must be pumped off or removed in any other manner from the entire surface of the waste water in the settling tank independent of their structure so that the associated suction or conveying devices must be guided accordingly, whereby in most cases attention must in addition be paid to the removers required in these settling tanks and their movement, which also just like the suction or conveying devices must be continuously moved. Large amounts of water are also pumped in with this method.

The basic purpose of the invention is therefore to carry out such a method identified in detail above in such a manner that the building expense is kept low and in particular a transfer of the floating matter is made possible in a simple manner and with very little water also in the drainage container.

The purpose is attained according to the invention in such a manner that the floating matter is conveyed by means of a worm conveyor into an intermediate container submerged into the settling tank and thereby displace the waste water existing therein through an opening arranged in the bottom area, and the conveyed matter accumulated in the intermediate container is pumped off as needed time-dependently or fill-dependently.

The intermediate container is thus connected as a buffer between a continuously operated removal of the floating matter from the surface of the waste water and a discontinuous evacuation determined by the amount of the accumulated floating matter.

The floating matter is removed from the surface in a wide front by the worm conveyor when same is moved during the conveying of the floating matter transversely to its longitudinally extending axle determined by the conveying direction along the surface of the waste water. The worm conveyor is thereby rotated advantageously such that same moves out of the water on the side where the floating matter is supplied. This results in an extremely effective removal of the floating matter. It is also conceivable to arrange the worm conveyor stationarily and to feed the floating matter to same by means of a suitable removing mechanism. Stationary worm conveyors can be used in the case of nonround tanks.

Thus, floating matter flows toward the worm conveyor over its effective length, and the floating matter is moved in direction of the longitudinal axle (conveying direction) to the end of the worm conveyor by the helically extending element rotating about its longitudinal axle, assuming a suitable structural design, as will be discussed below.

A funnel is advantageously arranged in the intermediate container closely below the waste water surface, which funnel fills out advantageously approximately the entire cross section of the intermediate container. This funnel is connected to the suction opening of a pump.

In order to support a pumping off through the funnel it is advantageous when little water flows from the settling tank through the bottom opening into the intermediate container. The amount of water can thereby be regulated by a bottom valve.

The floating matter resting on the waste water is seized at an optimum by the worm conveyor and is moved into the intermediate container, when the worm conveyor consisting of a worm shaft supported in the intermediate container and a helically extending element is arranged on the surface of the waste water and extends parallel thereto, particularly effectively due to the fact that since the worm conveyor is guided in height above the waste water such that the worm shaft, being thereby approximately tangent with the surface of the waste water, forms a barrier for the floating matter. The height guiding can thereby be done manually or by a level control; however, it can also be adjusted to a fixed value when the surface of the waste water itself is regulated in height. The inventive guiding of the worm conveyor assures that all floating matter reaches into the area of the helically extending member thereof and not to the discharge side of the worm conveyor when they are hindered during conveying by the helically extending member thereof from leaving the worm conveyor as will yet be discussed below.

The respective pumping off of the floating matter from the intermediate container occurs either in dependency of the amount of the fed-in conveyed matter or time-dependently.

The method is advantageously carried out by means of a floating matter removing device of the invention, in which the intermediate container is provided at one end of the worm conveyor which lies in its conveying direction so that the worm conveyor is utilized over its entire length. It is thereby advantageous when a drive motor for the worm conveyor is provided on the intermediate container (outside of the waste water) so that no movable inbetween links are necessary, instead all three building groups of the worm conveyor, of the intermediate container and of the drive motor form a structural unit and can be fixedly connected with one another at the latest during a mounting thereof on the settling tank.

It is advantageous for such a fixed association when a pipe-shaped closed, short worm housing for the worm conveyor is provided on the intermediate container, the length of which corresponds, for example, at least to the single, advantageously, however, to three times the outside diameter of the worm conveyor. The effect of the worm housing can thereby be still further improved by the inside diameter of the worm housing exceeding the outside diameter of the worm conveyor only by so much that a feeding back of the conveyed matter against the conveying direction is essentially impossible.

A safe guiding of the worm conveyor on the housing of the intermediate container is guaranteed in this manner without that the free or open lateral accessibility of the worm conveyor for receiving the arriving floating matter would be improperly limited, and on the other hand it can be assured with simple structural measures that the conveyed matter can be moved only in a conveying direction even in the direct vicinity of the intermediate container.

In particular it is especially place saving when the drive motor is provided on the part of the intermediate container which projects from the waste water, in particular when the worm shaft is thereby guided through the walls of the intermediate container which in this manner are utilized for supporting the worm conveyor.

In order to be able to mix and discharge pure waste water with the conveyed matter in the intermediate container, a feed valve can be provided in a simple manner on the intermediate container and preferably in the area of the container bottom, through which valve the inside of the intermediate container can be connected to the waste water in the settling tank. It is thereby advantageous when the feed valve can be operated by a preferably manually operable adjusting device leading out of the settling tank so that the admixing of waste water can be controlled. A mechanical adjusting device, for example, in the form of an adjusting rod is thereby sufficient.

A particularly preferred embodiment of the cleaning device of the invention provides a conveyor pump in the intermediate container for conveying the conveyed matter through the conveyor line so that with an encapsulated, efficient and space-saving pressure pump the transfer of the conveyed matter, which as a rule can be pumped easily, from the intermediate container can be accomplished.

The operation of the arrangement of the invention demands that the helically extending member is open over its entire length on the oncoming flow side so that the floating matter moves into its operating area. The helically extending member can provide a perfect conveying operation even when a discharge side baffle plate is provided on the worm conveyor over the entire length thereof on its side not facing the oncoming waste water. The baffle plate accordingly forms a rudiment of a worm housing; it is advantageous when it partially underpins the worm conveyor, preferably a small distance from the helically extending member. A worm conveyor constructed in this form operates highly efficiently and completely removes the floating matter lying on the waste water.

However, the worm conveyor is in a particularly preferred design mounted on a remover, which is mostly at any rate provided on the settling tank and is movable over the surface of the waste water, so that no additional guiding and driving mechanisms are needed. The removing device can be mounted in particular to the remover since several fastening mountings are provided for the worm conveyor on the remover. Also the baffle plate is then advantageously fixed to these mountings and can in this manner be mounted precisely fitting with respect to the helically extending member. The entire movement of the worm conveyor over the settling tank is thus coupled to the remover. As a result, the general very high required output is also in addition sufficient for moving the removing device.

Such an energy-saving design is also not limited to a certain geometric form of the setting tank; the arrangement is, in spite of this, particularly easily realizable when a circularly shaped settling tank with a rotating remover is provided.

The surface of the waste water is completely cleansed of floating matter in the settling tank in spite of the built-ins needed therein (support for the remover, intermediate container) when the worm conveyor has guide plates or guide rails at one or both ends, which rails slide along during the movement of the worm conveyor on the stationary walls of the settling tank in such a manner that the waste water is thereby supplied in the area of its surface to the worm conveyor, whereby a guide plate/guide rail can cover the intermediate container in oncoming flow direction of the waste water.

The method of the invention enables in connection with the associated removing device a cleaning of the waste water using very little energy, which is limited to the drive motor for the conveying operation of the worm conveyor and the evacuation of the intermediate container. It is particularly remarkable that the containers used for removing the conveyed matter can be set up at any desired spot outside and in the vicinity of the settling tank, and the remover together with the removing device can always be stopped at the same point so that also the needed system for pumping off and transferring of the conveyed matter can be designed stationarily.

BRIEF DESCRIPTION OF THE DRAWINGS

The invention will be discussed in greater detail hereinafter in connection with one exemplary embodiment and the drawings, in which:

FIG. 2 is a top view of FIG. 1, and FIG. 3 is an enlarged cross section A—A of FIG. 1, all in a schematic, simplified illustration.

DETAILED DESCRIPTION

Figure 1:
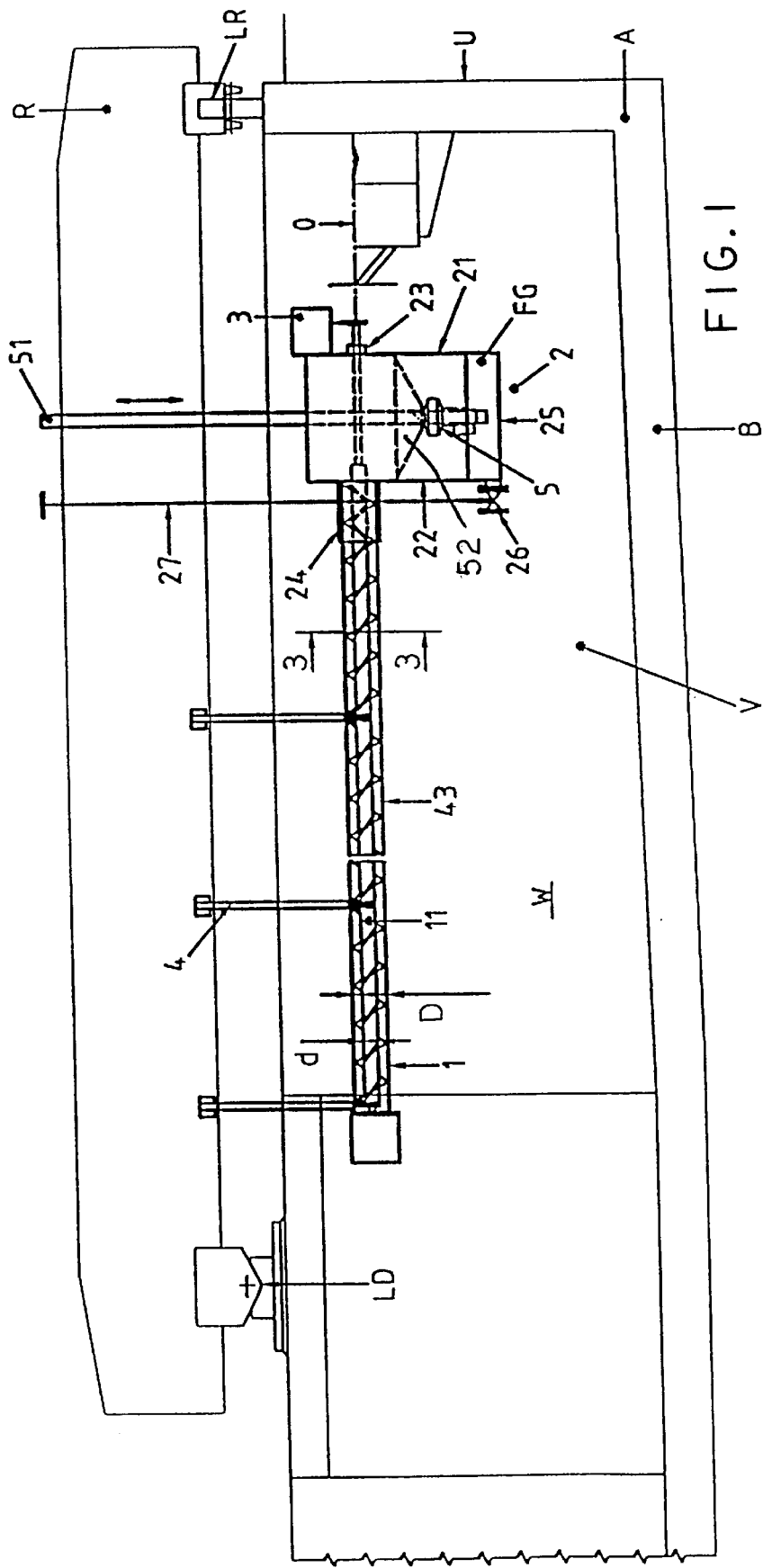
FIG. 1 illustrates a removing device embodying the invention in the cross section of a settling tank in position of use.

A removing device V is emphasized in the drawings by a thicker line; whereas an existing settling tank A including an associated remover R is shown in thin lines.

The settling tank A is bordered by an enclosing wall U and has furthermore a here circular tank bottom B. The walled-in space is largely filled with waste water W, which is to be cleaned and the surface O of which has been indicated in FIGS. 1 and 3. The remover R is rotatably supported on a rotary support LD centered in the settling tank A and extends radially outwardly from there as an arm to the enclosing wall U, on which the remover R is movably supported with its free end on a roller bearing LR.

The removing device V according to the invention consists essentially of a worm conveyor 1, an intermediate container 2 and a drive motor 3 for the worm conveyor 1.

The worm or auger conveyor 1 is fastened to the remover R by means of several mountings 4 in such a manner that its longitudinal axle 10 extends approximately parallel to the remover R and extends approximately along the surface O of the waste water W. The intermediate container 2 is also fixed to the remover R; the details of this have been left out of the drawings for better clarity. However, it can be recognized that the intermediate container 2 is provided at the outer end of the worm conveyor 1, which outer end is determined by the conveying direction of the worm conveyor 1, which conveying direction is illustrated by a direction arrow FR, and which outer end is adjacent to the enclosing wall U. The drive motor 3 is mounted on the intermediate container 2 on its side wall 21 facing toward the enclosing wall U.

A worm shaft 11 of the worm conveyor 1 having thereon a helically extending element 12 is rotated directly by the drive motor 3 about the longitudinal axle 10 when floating matter is supposed to be removed from the surface O and is supposed to be conveyed initially into the intermediate container 2 as conveyed matter FG. The worm shaft 11 is therefore guided through the intermediate container 2 and is guided in the side walls 21, 22 thereof in worm bearings 23 adjacent to the drive motor 3 as has been indicated in the drawings.

The worm conveyor 1 is guided in a pipelike closed worm housing 24 provided on the side wall 22 opposite the worm bearing 23, which worm housing 24 completely surrounds the helically extending element 12 with little clearance and has a length of one to three times the outside diameter D. The floating matter conveyed in the area of the pipelike closed worm housing 24 can from here only travel into the intermediate container 2 and collect on its inside in the form of conveyed matter FG, which must in a suitable manner be moved on to movable containers.

The worm shaft 11 has a diameter d and corresponding to FIG. 3 is easily rotatably supported on the mountings 4 by means of suspension members 41. Struts 42 are provided on the same mountings 4, on which struts a baffle plate 43 is fastened extending over the entire length of the free worm gear 12. The baffle plate 43 embraces the worm conveyor 1 as a rudimentary worm housing at least on a portion of the enveloping surface at a small gap width s.

The remover R is moved together with the removing device V in a circular direction of movement illustrated by the direction arrow DR, which in the arrangement of FIG. 2 is in a clockwise direction. The waste water W flows thereby against the worm conveyor 1 transversely with respect to its longitudinally extending axle 10 so that the waste water W in the area of its surface O dams up accordingly at the worm shaft 11 and the floating matter existing thereon moves into the operating area of the helically extending element 12. The baffle plate 43 prevents on the discharge side that the floating matter seized and removed thereby by the helically extending element 12 again leaves the area of the worm conveyor 1. The baffle plate 43 encloses in the exemplary embodiment according to FIG. 3 the helically extending element 12 in cross section only at a generous right angle, however, it can also be drawn to the apex of the enveloping surface of the helically extending element 12 or even yet slightly farther: only on the oncoming flow side same must remain open.

The conveyed matter FG is moved out of the intermediate container 2 by means of a conveyor pump 5 through a conveyor line 51 out of the area of the settling tank A. The conveyor pump 5 is here designed as an encapsulated pressure pump and the conveyor line 51 as a pressure pipe; however, it is also possible to use a suction pipe or a suction hose for the conveyor line 51 and to withdraw the conveyed matter FG via a suction pump installed outside of the system. A funnel 52 is inserted at the suction side of the conveyor pump 5, which funnel is arranged in the intermediate container 2 and is approximately adapted in cross section to the intermediate container, the funnel opening of which funnel is arranged slightly below the water level O in the settling tank A. The arrangement can be set up by simple craftsmanlike control-technical means in such a manner that a given height or depth of the conveyed matter FG in the intermediate container 2 is thereby not exceeded. The devices and the method for this lie within the framework of the common technical state of the art and are not part of the subject matter of the invention. However, it is obvious to interrupt the conveying of floating matter when a certain height or level of the conveyed matter FG has been reached, and to empty independently therefrom first the intermediate container 2. The sequence can also be controlled timedependently, and the suction opening for the conveyed matter FG can be adjustable in height.

In order to be able to accomplish a discharge of the conveyed matter FG without any problems, the possibility exists to mix waste water W to the compressed floating matter. A feed valve 26 is for this purpose provided in the area of the container bottom 25 of the intermediate container 2, the valve cross section of which feed valve 26 can be adjusted by means of an adjusting device 27. An additional flow is in this manner produced when sucking in the conveyed matter FG and small amounts of waste water W are sucked in between the floating matter and the sediments during the pump off of the conveyed matter FG with the conveyor pump 5, and the amount admixed to the conveyed matter FG is measured thereby by means of the adjusting device 27. The feed valve 26 is also used for discharging the water in the intermediate container, which is displaced by the added amount of floating matter.

In order for the floating matter distributed on the surface O to be completely removed during the rotary movement DR, guide plates or rails 61, 62 are provided at the respective ends of the worm conveyor 1, which ends are moved against the adjacent areas of the settling tank A. The guide plates or rails 61, 62 slide along the stationary walls of the settling tank A in such a manner that the waste water W is thereby fed in the area of its surface O to the worm conveyor 1. The guide rail 61 slides along the foundation of the rotary support LD, whereas the guide rail 62 covers the intermediate container 2 in the oncoming flow direction of the waste water W so that the floating matter in the radial boundary areas moves outwardly or inwardly into the operating area of the worm conveyor 1.

The embodiments of the invention in which an exclusive property or privilege is claimed are defined as follows:

1. A method for removing floating matter from the surface of waste water in a settling tank, the method including the steps of:

removing the floating matter from the waste water with a worm conveyor, wherein the worm conveyor conveys the removed floating waste into a intermediate container that extends below the surface of the waste water in the settling tank;

directing the removed floating matter through a funnel in the intermediate container into the suction side of a conveyor pump;

flowing waste water from the settling tank into the intermediate container through a valve provided in the intermediate container to mix the waste water and the removed floating matter; and pumping off the removed floating matter and waste water from the intermediate container with the conveyor pump into a conveyor line, wherein said pumping is performed on a discontinuous basis based on a fill state of the removed floating matter in the intermediate container or as a function of time.

2. The method according to claim 1, wherein, during said step of removing the floating matter, the removed floating matter is conveyed by the worm conveyor along the surface of the waste water in a direction parallel to a longitudinal axis of the worm conveyor.

3. The method according to claim 1, wherein, during said step of removing the floating matter, the worm conveyor is rotated about a longitudinal axle so that a helically extending member of the worm conveyor moves out of the water on a feed side of the floating matter.

4. The method according to claim 1, wherein, during said step of removing the floating matter, the worm conveyor is stopped during said pumping off of the removed floating matter.

5. The method according to claim 1, wherein the funnel has an opening that includes almost the entire cross section of the intermediate container.

6. The method according to claim 1, wherein the worm conveyor consists of a worm shaft supported in the intermediate container and a helically extending element is arranged on the surface of the waste water and parallel thereto.

7. The method of claim 1, wherein, in said step of flowing waste water into the intermediate container, the waste water is flowed from the settling tank at a level below the surface of the waste water and above a base of the settling tank.

8. A removing device for removing floating matter from the surface of waste water held in a settling tank, said removing device including:

a worm conveyor for skimming the surface of the waste water and conveying floating matter skimmed from the waste water, said worm conveyor having a discharge end;

an intermediate container that is positioned to be at least partially submerged in the waste water and connected to the discharge end of said worm conveyor for receiving the removed floating matter, said intermediate container having a bottom section that is located above a base of the settling tank;

a feed valve mounted to the bottom section of said intermediate container for regulating waste water flow from the settling tank into said intermediate container;

a funnel mounted in said intermediate container, said funnel having a funnel opening for receiving the removed floating matter from said worm conveyor;

a conveyor pump located in said intermediate container, said conveyor pump having suction side inlet for receiving the removed floating matter from said funnel and waste water from said feed valve and an outlet through which a mixture of the removed floating matter and the waste water is discharged; and a conveyor line connected to the outlet of said conveyor pump for receiving the mixed floating matter and waste water discharged from said conveyor pump.

9. The removing device according to claim 8, wherein a drive motor is provided for said worm conveyor on said intermediate container.

10. The removing device according to claim 9, wherein said drive motor is located on a side of said intermediate container opposite said worm conveyor on an inside or an outside surface of said intermediate container.

11. The removing device according to claim 10, wherein said worm conveyor has a worm shaft that is connected to said drive motor and said worm shaft extends through a wall of said intermediate container.

12. The removing device according to claim 8, wherein at least one pipe-shaped, closed worm conveyor housing for the discharge end of said worm conveyor is provided on said intermediate container.

13. The removing device according to claim 12, wherein the length of said worm conveyor housing is between one to three times the diameter of said worm conveyor.

14. The removing device according to claim 12, wherein the inside diameter of said worm conveyor housing exceeds an outside diameter of said worm conveyor only by so much that a feeding back of the conveyed matter against the conveying direction is essentially impossible.

15. The removing device according to claim 8, wherein said feed valve is operated by a manually operable adjusting device located outside of the settling tank.

16. The removing device according to claim 8, wherein said funnel opening corresponds approximately to a cross section of said intermediate container.

17. The removing device according to claim 8, wherein said funnel opening lies slightly below the surface level of the waste water in the settling tank.

18. The removing device according to claim 8, wherein said funnel opening lies 10 cm below the surface level of the waste water in the settling tank.

19. The removing device according to claim 8, wherein a discharge-side baffle plate is provided over the entire length on the worm conveyor on its side not facing the oncoming waste water.

20. The removing device according to claim 19, wherein said baffle plate partially underpins said worm conveyor and is spaced from a helically extending member of said worm conveyor.

21. The removing device according to claim 8, wherein said worm conveyor is arranged stationarily on a wall of the settling tank and cooperates with a removing mechanism for feeding the floating matter.

22. The removing device according to claim 8, wherein said worm conveyor is mounted on a remover provided on the settling tank and movable over the surface of the waste water in the settling tank.

23. The removing device according to claim 22, wherein several mountings are provided for the worm conveyor and are fastened on the remover.

24. The removing device according to claim 23, wherein a baffle plate is fastened to said mountings, said baffle plate extending partially around said worm conveyor.

25. The removing device according to claim 8, wherein the settling tank is circular.

26. The removing device according to claim 25, wherein said worm conveyor has guide plates or rails at one or both ends which, during the movement of the worm conveyor, slide along stationary walls of the settling tank such that the waste water is thereby fed towards said worm conveyor.

27. The removing device according to claim 26, wherein one said outer guide plate or guide rail covers said intermediate container in an oncoming flow direction of the waste water.

* * * * *